(12) United States Patent
Faty

(10) Patent No.: US 8,682,943 B1
(45) Date of Patent: Mar. 25, 2014

(54) DYNAMIC CLIENT DESKTOP INVENTORY

(75) Inventor: Moussa Faty, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 947 days.

(21) Appl. No.: 12/099,368

(22) Filed: Apr. 8, 2008

(51) Int. Cl.
*G06F 15/16* (2006.01)
*G06F 17/30* (2006.01)
*G06F 15/177* (2006.01)

(52) U.S. Cl.
USPC .... 707/827; 709/218; 709/221; 707/E17.014; 707/E17.032

(58) Field of Classification Search
None
See application file for complete search history.

(56) References Cited

U.S. PATENT DOCUMENTS

| | | | |
|---|---|---|---|
| 2002/0112067 A1* | 8/2002 | Chang et al. | 709/232 |
| 2004/0158817 A1* | 8/2004 | Okachi et al. | 717/122 |
| 2004/0196486 A1* | 10/2004 | Uchino | 358/1.14 |
| 2006/0036746 A1* | 2/2006 | Davis | 709/228 |
| 2007/0061450 A1* | 3/2007 | Burnley et al. | 709/224 |
| 2007/0180470 A1* | 8/2007 | Gill et al. | 725/52 |
| 2008/0052395 A1* | 2/2008 | Wright et al. | 709/224 |
| 2009/0119256 A1* | 5/2009 | Waters et al. | 707/3 |
| 2010/0180324 A1* | 7/2010 | Karur | 726/6 |

* cited by examiner

*Primary Examiner* — Shyue Jiunn Hwa
(74) *Attorney, Agent, or Firm* — Banner & Witcoff, Ltd.; Michael A. Springs

(57) ABSTRACT

Various examples of systems and methods are described that may allow for a computer inventory solution. Such a solution may involve, for example, periodically determining which of a plurality of users is currently logged in to a computer. The solution may further involve, for each of those of the users determined to be logged in to the computer: querying a database, via a network external to the computer, to determine whether that user and the computer are associated together in the database, and responsive to determining that the user and the computer are associated together in the database, incrementing a counter.

11 Claims, 2 Drawing Sheets

DYNAMIC CLIENT DESKTOP INVENTORY

BACKGROUND

It has always been challenging to maintain computers in a large organization. Most organizations employ a technical support department for this purpose. A technical support department typically has a number of responsibilities, including ensuring that each computer is kept up to date both as to hardware and software, performing troubleshooting activities, and maintaining the network and servers interconnecting the computers.

To adequately perform these tasks, it is desirable to have information about how each computer is configured. This is not necessarily easy, since the various computers may be configured differently, and these various configurations may change rapidly. And, in many organizations, users frequently move around from computer to computer, thereby making it difficult to determine for each computer who the true owner, or main user, is. Thus, a large amount of time is spent, on a fragmented basis, trying to obtain specific configuration information about the computers. This gathering of information can be painful, and the gathered data can be in varying formats, thus making the data difficult to manipulate and interrelate. For instance, members of the technical support department often need to physically visit a user's computer and manually collect configuration information about the computer, which takes time away from both the user and the technical support staff. Manual collection becomes nearly impossible for large groups, such as those containing thousands of computers. Lack of an accurate up-to-date inventory is a serious issue in such a time-sensitive context.

Nonetheless, there does not appear to be at present any repository or centralized accurate up-to-date inventory of computers and their configurations. Nor does there appear to be any standard method for obtaining and updating computer configuration information.

SUMMARY

Various examples of systems and methods will be described herein that allow for a complete and efficient computer inventory solution. Once set up, further maintenance and/or overhead work may not be required, or may be significantly reduced. The systems and methods may be expected to save, for instance, an average of one to two hours per day, per technical support department member that is involved in day-to-day technical support. These systems and methods may also save a technical support manager many hours in assessing the current inventory before making any decisions or implementing any changes in the computing environment These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
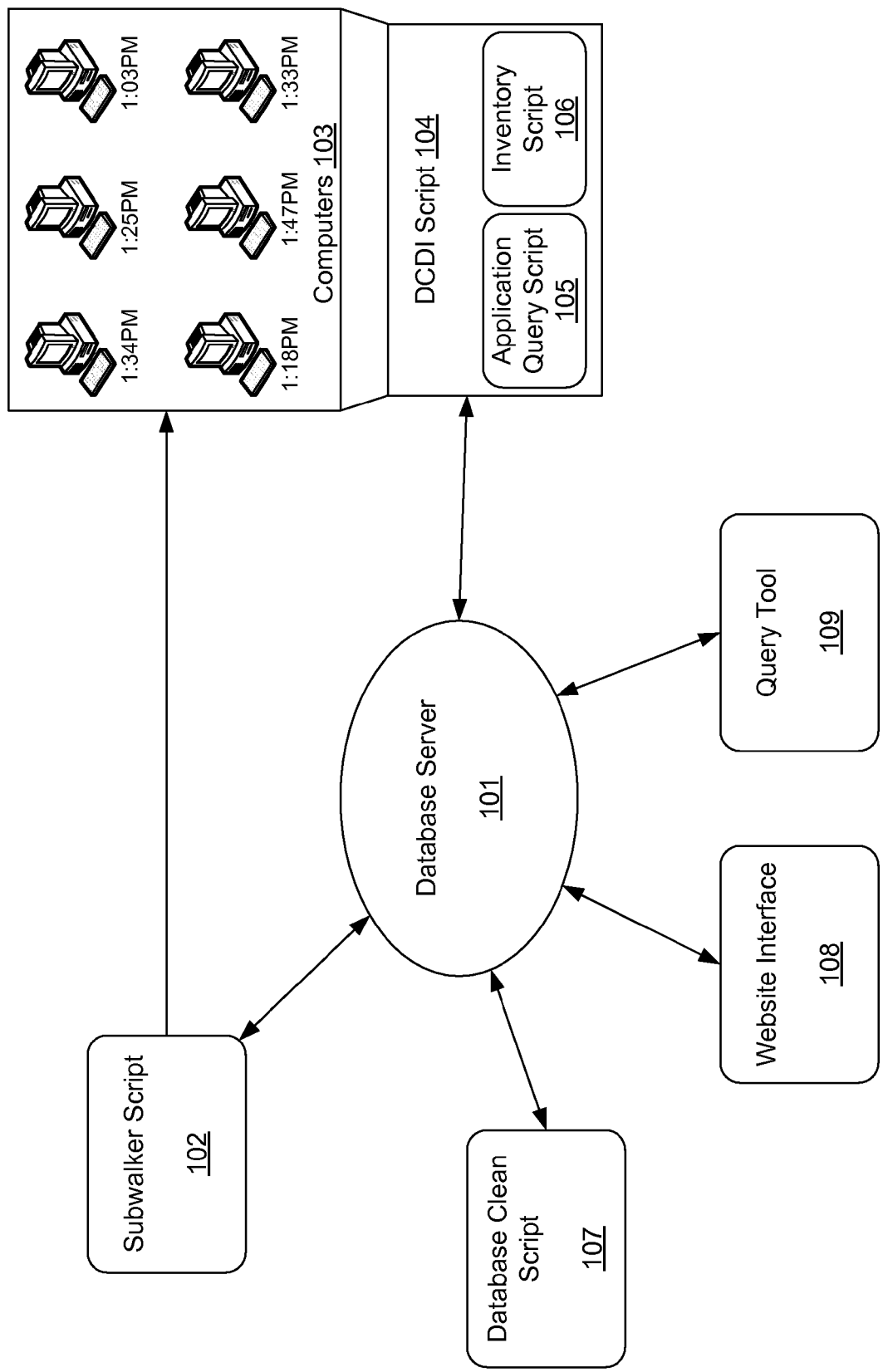
FIG. 1 is a functional block diagram of an illustrative system that may be used to collect, maintain, and query information about an inventory of computers and their users.

Systems and methods will be described for providing an efficient computer inventory solution. At a high level, an example of the system may work as follows. Referring to FIG. 1, a scheduled subwalker script 102 may have the job of providing each of a plurality of computers 103 on a network with a dynamic client desktop inventory (DCDI) script 104. Subwalker script 102 may scan defined subnets, ensuring that all of computers 103 found in the network are scheduled to run DCDI script 104 periodically (e.g., once per day). Subwalker script 102 may perform this task without any human involvement, if desired. Where subwalker script 102 is scheduled to run frequently, such as every couple of hours, this may enable DCDI script 104 to be automatically deployed rapidly onto any newly built computer in the network.

DCDI script 104 does not necessarily require any software installation on the computers. In such cases, DCDI script 104 may be written in a scripting language that works on computers' 103 native operating systems. For instance, VBScript, ADSI, WMI, WSH, HTA, and ADO are scripting languages that typically work on a Microsoft WINDOWS native operating system build.

DCDI script 104 collects and forwards information about the respective computer 103 that it is loaded on (e.g., hardware configuration, software configuration, which user is logged on and their environment settings, etc.) to a central network database, such as a Structured Query Language (SQL) database. This database may be implemented by a centralized database server 101 that is connected to the network. Because this data is periodically uploaded from various computers 103, the data in the database is dynamic and relatively up-to-date.

Data on the database of database server 101 may be accessed via any one or more interfaces, such as a front-end website interface 108 or by a computer on the network running a query tool 109, such as a Microsoft EXCEL data query method. The database may further be maintained by a database cleaning mechanism, such as a database clean script 107, that applies a data purging policy.

The network interconnecting the various elements 101-109 of FIG. 1 may be any type of network. As non-limiting examples, the network may include one or more of the following: a local area network (LAN), a wide area network (WAN), the Internet, a cellular telephone network, a landline telephone network, a wireless network, and/or a virtual private network (VPN).

The various components of illustrative embodiments of such a system will now be described in further detail.

Database Server 101

As mentioned above, database server 101 may implement a database such as a SQL or other relational database. In response to a query to the database, SQL server 101 may generate a result that answers the query. These queries may come from any of the other components 102-109 in FIG. 1. Database server 101 may also receive commands from any of components 102-109 to update or otherwise modify data in the database.

An example of a configuration of the database is shown below in Tables 1-7, which includes a PC Inventory table, an Application Inventory table, a Group Member table, a Hot Fixes table, a Network Sharing table, a Printer table, and a Location table. Each of the tables includes a plurality of fields. For instance, the PC Inventory table includes a pc_name field and a Domain field. It is noted that the term "PC," or "personal computer," will be used herein as an example of each computer 103. However, computers 103 may be any type of computer, such as but not limited to a handheld computer, a smart phone, a personal digital assistant (PDA), a laptop computer, a desktop computer, or a server.

The PC Inventory table includes information about each of computer 103. For instance, in the present embodiment, hardware configurations of computers 103 will be stored in fields such as system_mftr, system_model, ChassisType, proc_mftr, and other fields. Some software configuration (e.g., operating system configuration) of computers 103 is also stored, such as os_name, os_version, and os_build. Other software configurations are stored in the Application Inventory table, such as a listing of the various software applications installed on each of computers 103.

The PC Inventory table further includes information about the user(s) of each of computers 103. Each of computers 103 may have only a single user or more than one user. The identities of these users, and various information about the users, are stored in fields such as username, UserDomain, firstname, and lastname. Various user information is also stored in the Group Member table.

The various tables may be cross-correlated or otherwise associated with each other as a relational database.

TABLE 1

PC Inventory Table

| FIELDS | DESCRIPTION | FIELD TYPE | SOURCE |
|---|---|---|---|
| pc_name | Hostname | String | WMI |
| username | Username (Windows login) | String | WMI |
| UserDomain | Domain name of the username | String | WMI |
| Homedirectory | Network home drive path | String | Active Directory |
| homeDrv | Network user home drive | String | Active Directory |
| Exchange_server | User's mail exchange server name | String | Active Directory |
| IPaddress | IP address of the PC | String | WMI |
| DGateway | Default Gateway IP | String | WMI |
| DHCP | Nic DHCP status (enabled/disabled) | String | WMI |
| LogonServer | Domain logon server | String | Registry |
| system_mftr | PC manufacturer name | String | WMI |
| system_model | PC system model | String | WMI |
| ChassisType | PC Chassis type | String | WMI |
| proc_mftr | PC processor manufacturer | String | WMI |
| proc_mhz | PC processor speed | Number | WMI |
| bio_releasedate | PC bios release date | datetime | WMI |
| bios_serial | PC Serial Number | String | WMI |
| bios_BIOSVERSION | PC Bios version | String | WMI |
| diskdrive_size | PC harddrive size | Number | WMI |
| Vid_CardType | PC video card type | String | WMI |
| Vid_DriverVer | PC video card driver version | String | WMI |
| Vid_Driv_Date | PC video card driver date | datetime | WMI |
| page_inisize | PC Page file initial size setting | Number | WMI |
| page_maxsize | PC Page file maximum size setting | Number | WMI |
| os_name | Name of the Operating System | String | WMI |
| PCDomain | PC Domain Name | String | WMI |
| os_version | Operating System version | String | WMI |
| os_build | Operating System build | String | WMI |
| CDVer | Bofa CD build version | String | Registry |
| os_csdversion | Service pack installed | String | WMI |
| os_installdate | OS install date (PC build date) | datetime | WMI |
| os_totalmem | PC memory size | Number | WMI |
| os_lastbootuptime | Last time pc rebooted | datetime | WMI |
| Dataupdate_date | Date and time DCDI script ran on PC | datetime | DCDI Process |
| DataCaptured_date | Date and time DCDI first ran on PC | datetime | DCDI Process |

TABLE 1-continued

PC Inventory Table

| FIELDS | DESCRIPTION | FIELD TYPE | SOURCE |
|---|---|---|---|
| firstname | User's firstname | String | Active Directory |
| lastname | User's lastname | String | Active Directory |
| phonenumber | User's phone number | String | Active Directory |
| emailaddress | User's e-mail address | String | Directory Active |
| associatetitle | User's corporate title | String | Active Directory |
| location | User's Location code | String | Active Directory |
| Department | User's Department | String | Active Directory |
| StreetAddress | User's street address location | String | Active Directory |
| City | User's city location | String | Active Directory |
| State | User's state location | String | Active Directory |
| zipcode | User's zipcode location | String | Active Directory |
| Acct_Created | User's NT login account creation date | datetime | Active Directory |
| Acct_Changed | User's NT login account last changed | datetime | Active Directory |
| Acct_lastlogin | User's last login date to the PC | datetime | Active Directory |
| Acct_lastFailedLogin | User's last failed login attemp date | datetime | Active Directory |
| Acct_pwdLastChanged | User's NT account password last changed | datetime | Active Directory |
| User_AD_Container | User's Account Active Directory container | Active String | Directory |
| PC_AD_Container | PC account Active Directory container | String | Active Directory |
| PcBuiltFor | UserID entered when PC was being built | String | Registry |
| counter | Number of time DCDI ran on the PC with same user | Number | DCDI Process |
| rebootsvr | Field used to assign daily, weekly or monthly reboot | String | DCDI Process |
| maintsvr | Field used to enable maintenance script on the PC | String | DCDI Process |
| Owner | Shows primary user of the PC (ownership level of the PC) | Number | DCDI Process |
| UAT | Used to flag UAT users | String | DCDI Process |
| PCON | PC network status. (PC online or offline) | String | DCDI Process |
| Tier | User's tier level (used for internal purpose) | Number | DCDI Process |
| Manu | Manual only package push exception | String | DCDI Process |
| ManagersName | User's manager's name | String | Active Directory |
| GLBN | GLBN (for Internal use) | String | CORPdir |
| GLCostCenter | User's cost center number (for Internal use) | String | CORPdir |
| CostCenterName | User's cost center name | String | CORPdir |
| HierarchyCode | User's Hierarchy code | String | CORPdir |
| Notes | notes | String | DCDI Process |
| Keyboard | Keyboard type used | String | Registry |
| BB_BIO | Bloomberg biometric device in use | String | Registry |
| BB_Serial | User's Bloomberg serial number | String | Registry |
| BB_Sid | User's Bloomberg sid number | String | Registry |
| Screen | Number of screen connected to PC | Number | DCDI Process |

TABLE 1-continued

PC Inventory Table

| FIELDS | DESCRIPTION | FIELD TYPE | SOURCE |
|---|---|---|---|
| SeatN | User's seat number | String | CORPdir |
| Prev_User | Previous user logged on to the SPC | tring | DCDI Process |
| Prev_UserLogonD | Previous user logon date to the PC | datetime | DCDI Process |
| NicName | PC network card name | String | Registry |
| NicDrVer | PC network card driver version | String | Registry |
| NicSpeed | PC network card media type in use | String | Registry |
| Wifi | PC/Laptop wifi card in use | String | Registry |
| WifiDry | PC wifi card driver version | String | Registry |

TABLE 2

Application Inventory Table

| FIELD NAME | DESCRIPTION |
|---|---|
| pc_name | PC Hostname |
| AppName | Application name |
| Description | Application description |
| IdentiNumb | Software identification number |
| installdate | Date of software install |
| packagecache | Application install cache |
| vendor | Software vendor name |
| version | Application version |
| Datacaptured | Date of last capture |

TABLE 3

Group Member Table

| FIELD NAME | DESCRIPTION |
|---|---|
| AD_Folder | Active directory groups |
| firstname | User first name |
| lastname | User last name |
| username | User nbk (Windows username) |
| location | User mail code |
| Department | User department |

TABLE 4

Hot Fixes Table

| FIELD NAME | DESCRIPTION |
|---|---|
| pc_name | PC Hostname |
| HotFixID | Hot fix ID number |
| Description1 | Hotfix description |
| InstalledBy | Installer information |
| InstallDate | Installation date |
| location | User mail code |
| Department | User department |
| Datacaptured | Date of last capture |

TABLE 5

Network Sharing Table

| FIELD NAME | DESCRIPTION |
|---|---|
| username | User NB ID |
| pc_name | PC Hostname |
| DName | Drive Letter |

TABLE 5-continued

Network Sharing Table

| FIELD NAME | DESCRIPTION |
|---|---|
| ShareName | Share |
| firstname | User first name |
| lastname | User last name |
| location | User mail code |
| Department | User department |
| Datacaptured | Date of last capture |

TABLE 6

Printer Table

| FIELD NAME | DESCRIPTION |
|---|---|
| username | User NB ID |
| pc_name | PC Hostname |
| PrintServer | Print server name |
| PrinterName | Printer name |
| firstname | User first name |
| lastname | User last name |
| location | User mail code |
| Department | User department |
| Datacaptured | Date of last capture |

TABLE 7

Location Table

| FIELD NAME | DESCRIPTION |
|---|---|
| DGateway | Default gateway used to scan subnet |
| Mask | Subnet mask used to define how many hosts to scan in the network |
| HTSR | Hour to start running DCDI script on PC |
| MTSR | Minutes to start running DCDI script on PC |
| AppQTime | Hour on which the PCs will be scheduled to run the Application Query Script |
| SwitchName | Switch name |
| FloorN | Floor number where default gateway IP is located |
| Building | Building name where default gateway IP is located |
| StreetAddress | Street address where default gateway IP is located |
| City | City where default gateway IP is located |
| State | State where default gateway IP is located |
| Zipcode | Zip code where default gateway IP is located |
| Country | Country where default gateway IP is located |
| Continent | Continent where default gateway IP is located |
| Active | YES/NO: if YES, then DCDI is deployed at that PC; if NO, then DCDI will be removed from that location |

Database server 101 may further include another table in the database listing the internet protocol (IP) addresses and/or subnets of the network on which computers 103 would be located. This table may be queried by subwalker script 102 to perform its job.

Subwalker Script 102

Subwalker script 102 may be implemented as software on any computer, such as a server or personal computer. The main function of subwalker script 102 is to ensure that each of computer 103 has an updated version of DCDI script 104. To accomplish this, subwalker script 102 queries database server 101 to obtain the above-mentioned table of IP addresses and/or subnets of the network (from the Location table such as shown in Table 7), and begins walking through each IP address and/or subnet looking for computer 103.

For each computer of computers 103 that is found, subwalker script 102 checks whether DCDI script 104 is loaded on that computer. If not, then subwalker script 102 loads DCDI script 104 onto that computer. If DCDI script 104 is found, then subwalker script 102 determined whether DCDI script 104 is the most recent version. If so, then subwalker script 102 moves on to the next computer it finds. If not, then subwalker script 102 sends out an updated version of, or an update to, DCDI script 104 to that computer.

In addition, for each of computers 103 that are found, subwalker script 102 checks to see if DCDI script 104 for that computer is scheduled to execute at an appropriate time of day. For instance, the scheduled time of day may be incorrect or even missing. In this case, subwalker script 102 may correct the scheduled time for the job or even delete the scheduled job altogether (and re-scheduling it for a later time), thereby skipping that day. Job deletion may be performed, for instance, if subwalker script 102 detects that an error occurred in the associated computer 103 when trying to run the job. Subwalker script 102 may further maintain a log file for each computer of computer 103 that it interacts with, including a description or other indication of that interactions took place.
Computers 103 and DCDI Script 104

As previously described, each of client computers 103 is provided, by subwalker script 102 via the network, a copy of DCDI script 104. Subwalker script 102 additionally configures each copy of DCDI script 104 on each computer 103 so as to be scheduled to execute at a particular time of day. The scheduled time may be fixed or it may be fixed with a randomized element. For instance, the scheduled time may be 7:30 am plus or minus a random variation of up to thirty minutes. By allowing the different computers 103 to begin execution at various random times, this would prevent them all from running simultaneously and thereby preventing network and database server 101 overload by database server 101 being hit with queries from most or all of computers 103 simultaneously (or nearly simultaneously).

DCDI script 104 in the present illustrative embodiment actually includes two sub-scripts: application query script 105 and inventory script 106. Application query script 105 is responsible for collecting a list of the software applications installed on the respective computer 103. This list is stored in a data file local to computer 103 Application query script 105 may be scheduled to run at a predetermined time each day (or over some other period). For instance, application query script 105 may be configured to run at 7:30 am each day, prior to the typical work day. This is because application query script 105 may be expected to utilize a large amount of processor power, which might be inconvenient to a user that is simultaneously using computer 103.

Inventory script 106 is responsible for collecting hardware, registrty, and configuration information about respective computer 103. Where operating system of computer 103 is WINDOWS, some or all of this information may be collected from, for instance, WINDOWS Management Instrumentation (WMI) data. Inventory script 106 may further collect user login data and user account settings. Where the operating system of computer 103 is WINDOWS, for instance, some or all of this information may come from an Active Directory Service Interfaces (ADSI) query.

Once all information is collected, inventory script 106 then connects to the database of database server 101 and queries the database to determine how to process the collected data (both the data collected by inventory script 106 and the data collected by application query script 105).

Figure 2:
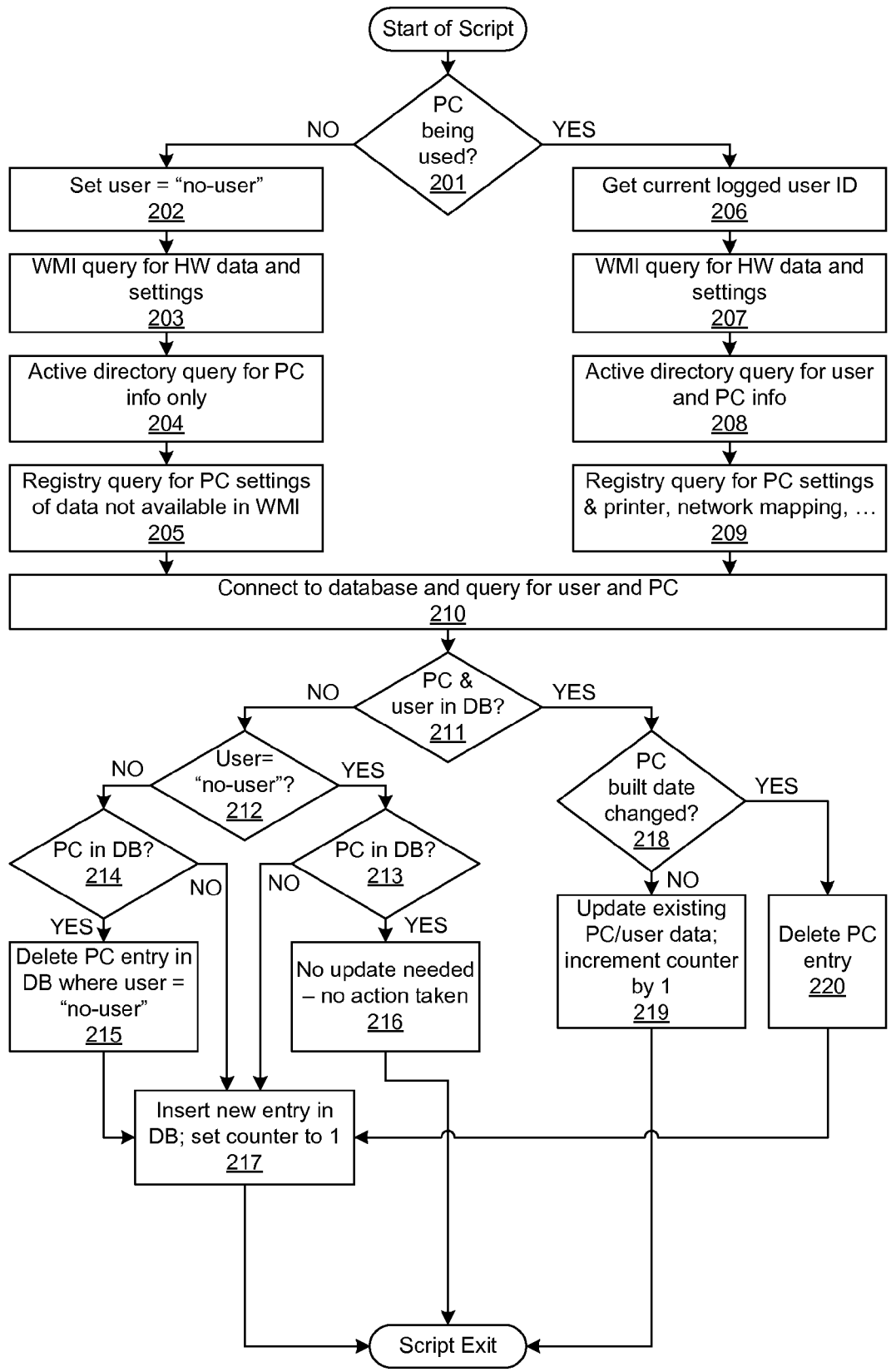
FIG. 2 is a flow chart showing illustrative steps for collecting and updating information about the inventory of computers, that may be performed by the system of FIG. 1.

FIG. 2 shows an illustrative process that may be followed by inventory script 106 for collecting data and updating the database. In this example, it is assumed that the operating system of computer 103 is WINDOWS. However, any operating system may be used. In step 201, inventory script 106 determines whether the respective computer 103 (in this example, computer 103 is a PC) is currently being used by a user. If not, then in step 202 inventory script 106 sets a flag (referred to herein as the user flag) to an indication of no user, such as the string "no-user."

Next, in step 203 inventory script 106 queries WMI for hardware data and configuration settings. In step 204, inventory script 106 queries the Active Directory for information about computer 103. Then, in step 205, inventory script 106 queries the registry for computer 103 settings that are not available from WMI.

Returning to step 201, if it is determined that computer 103 is currently being used by a user, then in step 206 inventory script 106 obtains the current logged user identification (user ID), and then performs step 207 (which is the same as step 203). In step 208, the Active Directory is queries for both information about computer 103 and information about the user having the user ID. In step 209, the registry is queried for settings not available from WMI, as well as any printer settings (e.g., user printer mapping), network mappings, etc.

Regardless of the outcome of the decision in step 201, inventory script 106 connects to the database of database server 101, and performs a database query for information associated with the pair of the user ID and the identity of the particular computer 103 on which inventory script 106 is running For instance, referring to Tables 1-7 above, a query may be run on the combination of fields pc_name and username, where pc_name includes the name of the computer 103 on which inventory script 106 is running, and where username includes the user ID logged in to that computer.

The query returns results from the database indicating whether the computer 103 and the user ID are already associated with each other as a pair in the database. In step 210, inventory script 106 makes this determination from the query results, and if they are not already associated, then in step 212 inventory script 106 further determines whether the user flag equals "no-user" as set originally in step 202. If not, then in step 214 inventory script 106 determines whether the computer 103 is in the database at all (e.g., whether the computer identity is found at all in the field pc_name). If so, then this entry is deleted in step 215 from the database for any instance in which it is associated with the username field equaling "no-user." Then, in step 217 a new entry is inserted into the database associating the computer 103 identity in field pc_name with the user ID logged into the computer 103 in field username, and inventory script 106 subsequently ends. Returning to step 214, if the computer 103 identity is not found in the pc_name field, then step 215 is skipped (since there is no entry to delete), and step 217 is performed and the script ends.

Returning to step 212, if it is determined that the user flag in computer 103 does equal "no-user," then it is determined in step 213 whether the computer 103 identity is found at all in the field pc_name. If not, then step 217 is performed. But if the computer 103 identity is found in the field pc_name, then in step 216 no action is taken and the script ends.

Returning to step 211, if it is determined that the database contains an association between the computer 103 identity in field pc_name and the logged-in user ID in field username, then inventory script 106 performs a further database query to determine whether the build date of computer 103 is different from the build date for that computer 103 as stored in the database in the field os_installdate (Table 1). If it is found to be different, then the entry for that computer 103 in the database is deleted in step 220, and a new entry is created in step 217. Subsequently, the script ends.

If, however, it is determined in step 218 that the actual build date is not different from the build date in the field os_install-date, then in step 219 the collected data from both inventory script 106 and application query script is updated into the database into the appropriate fields, and the script ends.

In addition, in step 219 the counter field (Table 1) in the database, for that user ID and computer 103 identity pair, is incremented by one to indicate that the same user ID was found to again be logged in to that same computer 103. The counter field may be used to determine how often each of one or more users are logged in to a particular computer, and ultimately to determine who is the main user, of the computer 103. It may be assumed that the main user (i.e., the user who has the highest counter field) for that computer 103 is the owner of that computer 103. This may change dynamically, depending upon who has been logged in to that computer 103. The owner may be reflected in the database in the Owner field (Table 1), which as discussed below may be maintained by database clean script 106.

Database Clean Script 106

Database clean script 106 may run on a computer, such as a personal computer or a server connected to the network. Database clean script 106 may be run periodically, such as every hour, and may be responsible for interacting with the database as follows.

In general, database clean script 106 periodically calculates and updates the Owner field of the database in accordance with the counter field, as discussed previously. This may allow the technical support department to assign any of the computer 103 to a primary and/or secondary user based on the highest counters. Database clean script 106 further periodically executes a data purging policy, such as shown below in Table 8. For example, Database clean script 106 may periodically look for and purge associated pairs of users and computers in which the user has not recently used the computer recently, such as within the last twenty-five days in the case of a non-administrator user of an online computer, which is policy number (PN) 2 in Table 8.

Database clean script 106 further periodically pings hostnames from the PC Inventory table of the database and updates the PCON field in the database. The PCON field is a simple flag (e.g., one bit) that indicates the current online/offline status of each computer 103. Database clean script 106 further periodically updates user information in the PC Inventory table of the database, such as tier level, cost center, etc., from a corporate directory database or the like.

By performing these tasks on a regular basis, database clean script 106 may provide for a high level of data quality in the database, and may eliminate (or at least reduce) the need for manual maintenance of the database.

TABLE 8

Data Purging Policies That May be Applied by Database Clean Script 106

| PN | Policy | Description |
|---|---|---|
| 1 | Dataupdate_date < 15D and PCON = NO | Delete Pairs where last time agent ran against the pairs was more than 15 days ago AND the hostname is offline (not pinging) |
| 2 | Dataupdate_date < 25D | Delete Pairs where last time agent ran against the pairs was more 25 days ago. |
| 3 | Dataupdate_date < 15D and the Windows username is a Windows administrator account | Delete Pairs where last time agent ran against the pairs was more 15 days ago AND the Windows username is a Windows administrator account |
| 4 | Dataupdate_date < 4D and Windows username is a Windows administrator account and counter <= 2 | Delete Pairs where last time agent ran against the pairs was more 4 days ago AND the Windows username is a Windows administrator account AND the counter field is less or equal to 2 |
| 5 | Dataupdate_date < 7D and counter <= 2 | Delete Pairs where last time agent ran against the pairs was more 7 days ago AND the counter is equal or less than 2 |
| 6 | Clear Data from Application Inventory table where hostname non-existent in PC Inventory table | Delete Pairs in the Application Inventory table where hostnames are not found in the PC Inventory table. |
| 7 | Clear Data from Network Sharing table where hostname non-existent in PC Inventory table | Delete Pairs in the Network Sharing table where hostnames are not found in the PC Inventory table. |
| 8 | Clear Data from Printer table where hostname non-existent in PC_inventory | Delete Pairs in the Printer table where hostnames are not found in the PC Inventory table. |
| 9 | Clear Data from Group Member table where username non-existent in PC Inventory table | Delete Pairs in the Group Member table where Windows usernames are not found in the PC Inventory table. |
| 10 | Clear Data from Hot Fixes table where hostname non-existent in PC Inventory table | Delete Pairs in the Hot Fixes table where hostnames are not found in the PC Inventory table. |

Note:
Dataupdate_date: Gets stamped with a current date and time every time the agent runs against the pair.
PCON: Shows By YES or NO if the PC is online or offline
Counter: Number is incremented by 1 everytime the DODI agent runs against the pair Website Interface 107

Website interface 107 may be implemented through the Internet and/or a company intranet as a front-end graphical user interface (GUI)-based website for querying the database. To implement this, either the network includes the Internet or an intranet, or the network is connected to the Internet or an intranet.

Data may be accessed from the database in many ways through website interface 107. For example, one may execute queries that search users by their cost center, location software application ownership, computer ownership, and/or based on any other constraints as desired. In general, any query of the datbase may be executed from, and the results of those queries displayed at, website interface 107.

Query Tool 108

The database may further be queries from query tool 108, which may reside on a computer that is part of the network. The query tool may be embodied, for instance, as a Microsoft EXCEL based query tool. Such an embodiment may allow for particularly complex queries to be created and tailored for specific needs. The query tool may further provide reports based on the queries that are implemented.

CONCLUSION

Thus, various examples of systems and methods have been described herein that may allow for a complete and efficient computer inventory solution.

What is claimed is:

1. A method, comprising:
 periodically determining which of a plurality of users is currently logged in to which of a plurality of computers;
 for each of those of the users determined to be logged in:
 querying, by a first computer, a database that stores data representing a plurality of counters and a plurality of user/computer pairs, each counter being associated with a different one of the user/computer pairs, via a network external to the computer, to determine whether one of the user/computer pairs exists for the respective user and computer in the database, the data further representing an owner for each of the plurality of computers, and
 responsive to determining that the one of the user/computer pairs exists in the database, incrementing the one of the counters associated with the one of the user/computer pairs; and
 for each of the plurality of computers:
 determining which of the counters for the user/computer pairs that include the respective computer represents a highest count value, and
 updating the data representing the owner for the respective computer to indicate the user represented by the one of the user/computer pairs determined to exist in the database,
 wherein the database further stores data representing a build date of each of the computers, and wherein the method further comprises:
 for each of those of the users determined to be logged in to the computer:
 determining a current build date of the computer,
 comparing the current build date of the computer with the build date of the computer as stored in the database, and
 performing the incrementing of the counter responsive to determining that the current build date of the computer and the build date of the computer as stored in the database are a same date; and
 in response to determining, for each of the computers, that the build date as represented by the database has changed, deleting an entry in the database for a respective one of the computers.

2. The method of claim 1, wherein the method further comprises:
 periodically determining a software configuration of the computer; and
 periodically updating the database via the network with the software configuration.

3. The method of claim 1, wherein the method further comprises:
 periodically determining a hardware configuration of the computer; and
 periodically updating the database via the network with the hardware configuration.

4. The method of claim 1, wherein said periodically determining is periodically performed at a plurality of predetermined scheduled times, and said incrementing is performed at a randomized time.

5. The method of claim 1, further comprising determining a main user of the computer based on values of the counters for the plurality of users, and storing an indication of the main user in the database.

6. A method, comprising:
 storing a database configured to associate each of a plurality of computer identifiers of each of a plurality of computers with at least one of a plurality of user identifiers, thereby defining a plurality of computer/user identifier pairs, and to further associate a different count value with each of the plurality of computer/user identifier pairs;
 incrementing a first one of the count values that is associated with a first one of the computer/user identifier pairs;
 storing the incremented first one of the count values; and
 for each of the computers:
 determining a main user based on the count values of the computer/user identifier pairs identifying the respective computer, and
 storing data indicating the determined main user; and
 determining, for each of the computers, whether a build date of the computer has changed, wherein said incrementing the first one of the count values is performed responsive to determining that the build date has not changed,
 wherein the database further associates each of the computer identifiers with an online status indicator, the method further comprising pinging a plurality of computers each associated with one of the computer identifiers, and updating the online status indicators based on results of the pinging.

7. The method of claim 6, wherein the database is further configured to associate each of the computer identifiers with computer hardware configuration data.

8. The method of claim 6, further comprising:
 receiving, via a network, a first command from a first computer, wherein incrementing the first one of the count values is performed responsive to the first command;
 receiving, via the network, a second command from a second computer; and
 responsive to the second command, incrementing a second one of the count values that is associated with a second one of the computer/user identifier pairs; and
 storing the incremented second one of the count values.

9. The method of claim 6, further comprising periodically removing a subset of the computer/user identifier pairs.

10. The method of claim 9, further comprising periodically determining the subset based on how long ago some of the users identified by the user identifiers were last using some of the computers identified by the computer identifiers.

11. The method of claim 6, wherein for each of the computers, determining the main user comprises determining the main user to be the user that is identified by the computer/user identifier pair having a highest one of the count values that identifies the respective computer.

* * * * *